UNITED STATES PATENT OFFICE.

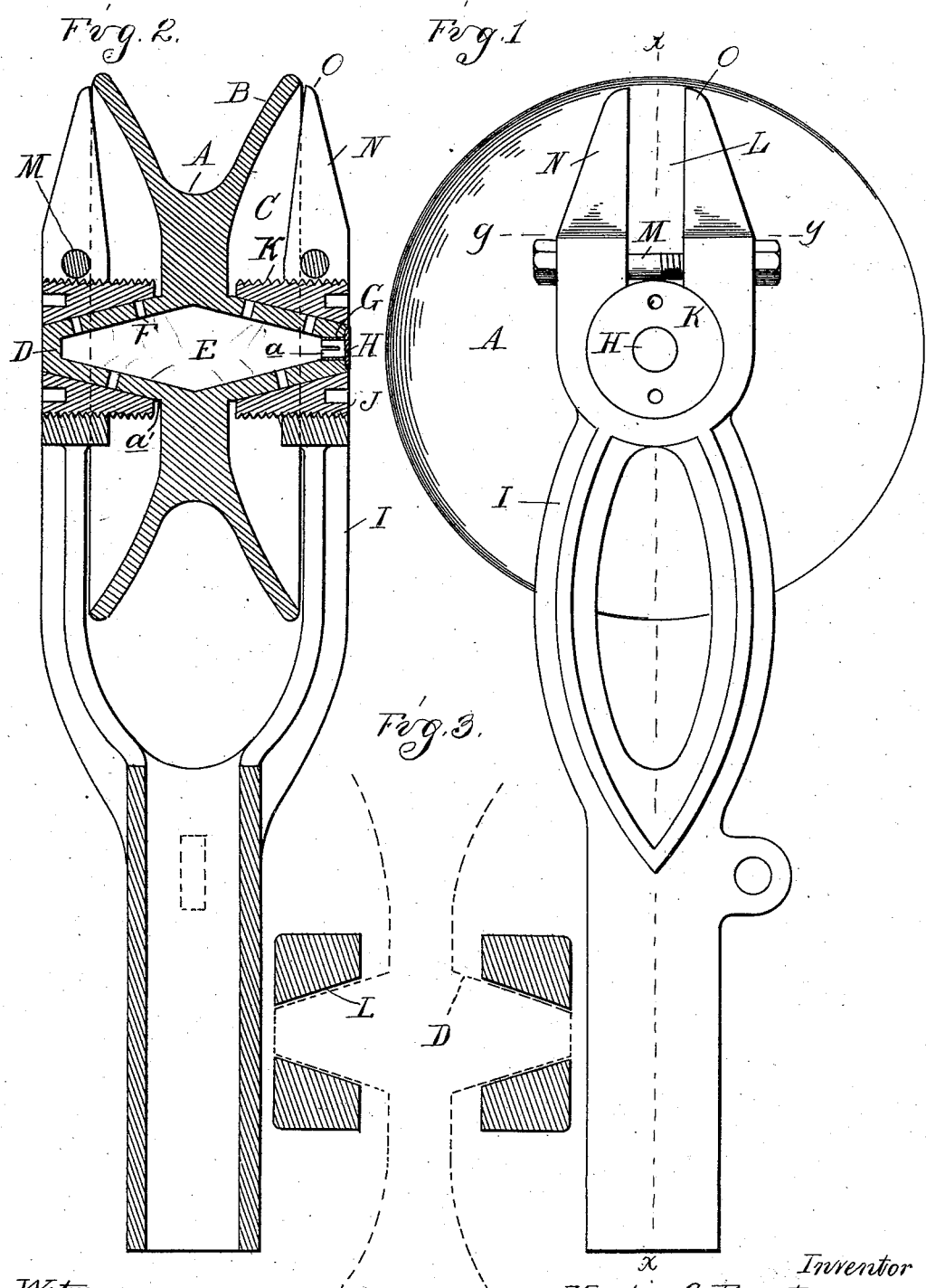

MARTIN C. FURSTENAU, OF DETROIT, MICHIGAN, ASSIGNOR OF ONE-HALF TO ELLSWORTH S. BRYANT, OF SAME PLACE.

TROLLEY-WHEEL.

SPECIFICATION forming part of Letters Patent No. 566,161, dated August 18, 1896.

Application filed February 24, 1896. Serial No. 580,450. (No model.)

*To all whom it may concern:*

Be it known that I, MARTIN C. FURSTENAU, a citizen of the United States, residing at Detroit, in the county of Wayne and State of Michigan, have invented certain new and useful Improvements in Trolley-Wheels, of which the following is a specification, reference being had therein to the accompanying drawings.

The invention consists in the peculiar construction, arrangement, and combination of parts, and more particularly in the means for attaching or detaching the wheel to or from the pole, for lubricating the bearings, and for taking up the wear, all as more fully hereinafter described.

In the drawings, Figure 1 is a side elevation of my trolley and support. Fig. 2 is a central section on line $x\ x$, Fig. 1; and Fig. 3 is a section on line $y\ y$, Fig. 1.

A is a trolley-wheel having the flanges B and preferably concaved or dished upon its opposite sides, as shown at C.

D are stub-axles extending from opposite sides of the wheel, preferably integrally formed therewith and of tapering or conical shape.

E is a chamber formed within the wheel and extending into the opposite stub-axles.

F are perforations in the stub-axles communicating with the chamber E.

G is an aperture in the end of one of the axles, and H is a cap, preferably formed of sheet metal, with the inwardly-extending split sleeve $a$ adapted to close said aperture.

I is the fork or bifurcated arm at the upper end of the trolley-pole in which the trolley-wheel is journaled.

J are apertures formed in the opposite bifurcations adapted to receive bushings K. These bushings are preferably exteriorly screw-threaded to engage with corresponding screw-threads in the apertures J and are provided with conical seats or bearings corresponding in taper to the stub-axles D, which are journaled therein.

L are entering-slots in the upper end of the fork leading into the apertures J. Those shown in Fig. 3 of the drawings are of such a cross-section as to permit of the stub-axles D entering the apertures J when engaging the wheel with the fork.

M are screws or bolts passing transversely through the bifurcations adapted to clamp the bushings K in position. The upper end of the fork is provided with the tapering lugs or extensions N, terminating in the rounded point O in proximity to the flanges B of the wheel.

The parts being thus constructed, to engage the wheel with the fork the bushings K and bolts M are first removed, and the stub-axles D are passed through the slots L into the apertures J. The bushings K are then screwed in from opposite sides and when properly adjusted are firmly held in this position by the clamping-bolts M. The cap H may be removed and the chamber E filled with a suitable lubricant, (such as graphite and oil,) which, when the trolley is in motion, passes through the perforations F and lubricates the bearing. At the same time the centrifugal force tends to throw the lubricant to the center of the chamber E, at which point it is of greater diameter, and thus prevents it from being forced out from the bearing and lost. The lugs or extensions N come into such close proximity to the flanges of the wheel as to prevent all danger of the trolley-wire ever slipping between the fork and wheel.

When the bearings or axles wear, the lost motion may be taken up by screwing in the bushings K, and to avoid wearing a shoulder in the axles at the inner ends of said bushings I preferably begin the taper on the axles at that point, leaving a straight or cylindrical portion $a'$ between the sides of the wheel and the bushings.

What I claim as my invention is—

1. The combination with a trolley-wheel, having stub-axles projecting from the opposite sides thereof, of a supporting-fork or bifurcated arm having apertures formed in its opposite bifurcations and entering-slots adapted to admit the stub-axles into said apertures, and bushings adapted to be secured in said aperture forming the journal-bearings for said stub-axles.

2. The combination with a trolley-wheel of tapering stub-axles extending from the opposite sides thereof, a supporting-fork or bifurcated arm having apertures formed in its opposite bifurcations and entering-slots adapted to admit the stub-axles into said apertures, and bushings provided with conical bearings for said axles, laterally adjustably secured in said apertures.

3. The combination with a trolley-wheel of the tapering stub-axles D integrally formed therewith and extending from opposite sides, the fork I having the screw-threaded apertures J formed in its bifurcations and V-shaped entering-slots L adapted to admit said stub-axles into said aperture, the exteriorly-screw-threaded bushings K forming journal-bearings for said stub-axle adapted to be engaged with the apertures J and the transverse clamping bolts or screw M.

4. A trolley-wheel having hollow tapering stub-axles forming a centrally-enlarged lubricant-chamber tapering toward each end, a fill-opening at one end thereof, a cap therefor and perforations in the sides of the stub-axles, in combination with a supporting-fork having corresponding tapered journal-bearings for said stub-axles.

In testimony whereof I affix my signature in presence of two witnesses.

MARTIN C. FURSTENAU.

Witnesses:
  M. B. O'DOGHERTY,
  O. F. BARTHEL.